United States Patent [19]

Stark, Jr.

[11] 4,198,485
[45] Apr. 15, 1980

[54] FIRE RESISTANT, EXPANDED STYRENE POLYMER MATERIAL

[75] Inventor: Fred J. Stark, Jr., Minnetonka, Minn.

[73] Assignee: Rubber Research Elastomerics, Inc., Minneapolis, Minn.

[21] Appl. No.: 846,690

[22] Filed: Oct. 31, 1977

Related U.S. Application Data

[63] Continuation-in-part of Ser. No. 698,057, Jun. 21, 1976, abandoned.

[51] Int. Cl.$^2$ ............................................. C08J 9/22
[52] U.S. Cl. ...................................... 521/55; 521/57; 521/907
[58] Field of Search ................. 260/2.5 B; 521/55, 57

[56] References Cited

U.S. PATENT DOCUMENTS

| | | | |
|---|---|---|---|
| 3,084,126 | 5/1969 | Carlson, Jr. et al. | 260/2.5 E |
| 3,304,274 | 2/1967 | Eng | 260/2.5 B |
| 3,429,836 | 2/1969 | Stastny et al. | 260/2.5 B |
| 3,434,980 | 3/1969 | Stastny et al. | 260/2.5 B |
| 3,444,104 | 5/1969 | Immel et al. | 260/2.5 b |
| 3,547,840 | 12/1970 | Stastny et al. | 260/2.5 B |
| 3,994,836 | 11/1976 | Honer | 260/2.5 FP |

*Primary Examiner*—Morton Foelak
*Attorney, Agent, or Firm*—James R. Haller

[57] ABSTRACT

Pre-expanded styrene polymer particles, which may contain one or more pre-expanded styrene polymer beads, are coated with sufficient water glass so that the particles, when dried to a reversible, tack-free pourable state, comprise from about 30% to 80% styrene polymer solids. The particles may be shaped into a desired article configuration and then dried to a tack-free state, the particles adhering together through the water glass, and the resulting article having a bulk density of from about 1.25 lbs. to 3 lbs. per cubic foot. The water glass or the pourable particles may be treated to decrease alkalinity and to cause irreversible precipitation of water glass solids, rendering the final product essentially waterproof.

18 Claims, No Drawings

FIRE RESISTANT, EXPANDED STYRENE POLYMER MATERIAL

This application is a Continuation-in-part of application Ser. No. 698,057, filed June 21, 1976, now abandoned.

BACKGROUND OF THE INVENTION

Expandable styrene polymer beads are well known, as are the articles which can be formed therefrom. The beads ordinarily contain a small amount of gas-producing material such as n-pentane so that the beads, when heated to the softening point, expand to form a cellular product. The expanded beads are employed, for example, as insulating sheets in residential and commercial buildings, for making drinking cups, ice chests for picknickers, and the like.

The expanded, cellular styrene polymer products thus described readily support combustion, and liberate quantities of dense, black smoke.

In the production of insulating sheets of cellular styrene polymer materials, it is customery to first produce fairly large "pillows" or bulk sections of cellular material, following which the pillows are cut to the desired shape and size. The amount of scrap which is produced can be quite large, and can range up to 15% or more of the volume of the pillow. It is time consuming and difficult to collect and reuse the scrap.

Cellular, expanded styrene polymer products have good insulating qualities, and because of their light weight are easily carried and managed. Products of this type ordinarily have bulk densities in the neighborhood of 1 lb. per cubic foot. Although attempts have been made to render products of this type fireproof, I am unaware of any of such products which have become commercially feasible. Certain of these attempts have produced cellular articles having comparatively high densities (up to 50 lbs. per cubic foot; U.S. Pat. No. 3,429,836), and the presence of exceedingly large quantities of inorganic material such as silicates in such products not only renders the products overly dense for desired commercial utility, but may reduce the insulating properties of the materials.

It would be desirable to provide a system whereby pre-expanded styrene polymer beads, or particles composed of one or more of such beads, could be rendered non-combustion-supporting and could further be easily shaped into lightweight, fire-resistant, highly insulating articles.

SUMMARY OF THE INVENTION

I have now found that cellular styrene polymer particles, which may contain one or more expanded styrene polymer beads, can be coated with water glass in sufficient amounts so that when the particles are dried to a reversible, pourable, tack-free state, the particles comprise from about 30% to about 80% of styrene polymer solids. The particles may be molded or formed into articles of a desired shape, such as insulating sheets, and the tacky surfaces of the particles provided by incomplete drying or by remoistening the particles causes the particles to adhere tenaciously together. Further drying of the shaped articles to a state in which the particles are tack-free provides the articles with bulk densities of from about 1.5 lbs. to about 3 lbs. per cubic foot, and preferably from about 1.5 to about 2.0 lbs. per cubic foor. When the flame from, for example, a propane torch is applied to the article, the article disintegrates slowly but does not liberate any visible combustion products. When the propane torch is removed, no further combustion occurs. The area of the article which had thus been flamed is reduced to a fine, greyish white ash.

Thus, in one embodiment, my invention relates to a non-combustion-supporting insulating material which comprises a mass of styrene polymer particles composed of one or more expanded styrene polymer beads. The particles have individual coatings of dried water glass adhering the particles into a mass having a bulk density of from about 1.25 lbs. to about 3 (and preferably 1.5–2) lbs. per cubic foot, and the mass contains from about 30% to about 80% styrene polymer solids.

In a further embodiment, my invention relates to a non-combustion supporting insulating material which comprises cellular styrene polymer particles composed of one or more pre-expanded styrene polymer beads, the particles each having a substantially continuous coating of water glass and being substantially tack-free and pourable, the particles comprising from about 30 to about 80 weight percent of styrene polymer solids and being formable into a mass having, upon further drying, a bulk density of from about 1.25 to about 3 and preferably from about 1.5 to about 2 lbs. per cubic foot.

In another embodiment, my invention relates to a method for preparing styrene polymer particles which are composed of one or more pre-expanded styrene polymer beads. The method comprises coating the particles with water glass from an aqueous solution to an extent that the particles, when dried to a reversible, pourable tack-free state, comprise from about 30% to about 80% styrene polymer solids. The thus-coated particles are useful in preparing shaped, insulating, non-combustion-supporting articles.

In yet another embodiment, my invention relates to a method for preparing a non-combustion-supporting cellular shaped article of cellular, expanded styrene polymer. The method comprises coating styrene polymer particles which are composed of one or more pre-expanded styrene polymer beads with sufficient water glass from an aqueous solution so that the particles, if dried to a tack-free state, comprise about 30% to about 80% styrene polymer solids. The coated particles are formed into a desired article configuration. The tack surfaces of the particles cause the latter to adhere strongly to one another, and the article is thereafter dried to a bulk density of from about 1.25–3 and preferably 1.5–2 lbs. per cubic foot. The particles may be dried to a tack-free, pourable state before the shaping procedure, following which moisture is added to the particles (as by low-pressure steam) to render the particle surfaces tacky.

In yet another embodiment, my invention relates to a pourable, non-combustion-supporting insulating material comprising styrene polymer particles each having a substantially continuous coating of water glass and being substantially tack-free, the particles being formable into a waterproof, insulating object having a bulk density, upon drying, of from about 1.25 to about 3.0 and preferably from about 1.5 to about 2.0 lbs. per cubic foot, the pourable material containing from about 30 to about 80 weight percent of styrene polymer solids.

In yet a further embodiment, the invention relates to a method for preparing a pourable mass of pre-expanded styrene polymer beads having a continuous coating of water glass for use in the formation of waterproof, combustion-resistant insulation having a bulk density of from about 1.25 to about 3 and preferably from about 1.5 to about 2 lbs. per cubic foot. The method includes the step of reducing the alkalinity of the water glass moiety to cause non-reversible precipitation. A water glass solution may be treated with $CO_2$ or other acidifying substance until some precipitation occurs, as evidenced by the formation of a haze in the solution, following which the pre-expanded styrene polymer particles are coated with the solution. Alternatively, the particles may be coated with the solution and dried to a substantially tack-free, pourable state, and then acidified, as by passing $CO_2$ gas through the particles. If desired, $CO_2$ gas may be employed as the drying agent to both dry the particles and to render the coatings insoluble.

DETAILED DESCRIPTION

The cellular, pre-expanded styrene polymer particles employed in the present invention may be individual, pre-expanded styrene polymer beads of the type known to the art, or may be particles which include one or more, e.g., 2-20, beads. The latter particles may be provided by grinding the scrap which is produced in the well-known procedure for manufacturing cellular styrene polymer insulating boards in which a large block or pillow of cellular material is trimmed by means of hot wires into the desired sheet shapes. Styrene polymers as referred to herein includes homopolymers of styrene (polystyrene), and interpolymers of styrene containing a predominate portion of styrene (e.g., greater than 50 weight percent and preferably greater than 75 weight percent). Examples of monomers that may be interpolymerized with styrene include conjugated 1,3-dienes such as butadiene, alpha, beta-unsaturated monocarboxylic acids and their derivatives such as acrylic acid, methyl acrylate, etc., acrylamide, acrylonitrile, etc. If desired, blends of styrene polymer with other polymers may be employed, such as blends of styrene polymer with rubbery diene polymers, etc. The styrene monomer, of course, may be replaced with its closely related hololouges such as alphamethylstyrene, o-, m-, and p-methylstyrenes, etc. The sizes of the particles employed in the present invention can vary widely; it is desired, however, to use particles having a mean diameter of up to about $\frac{1}{2}$ inch. Individual beads may have a diameter of up to about $\frac{1}{4}$ inch.

As thus described, the styrene polymer particles are pre-expanded, and ordinarily have been aged to permit escape of the commonly flamable expanding agents such as n-pentane. The particles are generally dry to the touch, and readily pick up charges of static electricity which has rendered such particles difficult to handle.

In the practice of my invention, a batch of the above-described particles are immersed in a large container of an aqueous solution of water glass having a sufficient concentration to render the solution slightly syrupy. The particles are stirred to insure that each particle has been thoroughly wetted with the water glass solution, following which the particles are removed from the container (e.g., in a wire screen or bag) and are at least partially dried. The drying may be accomplished by passing a stream of air through the particles while tumbling them or by mild heating or the like, the drying step serving to remove water from the water glass coating. As drying proceeds, the coating on the particles passes from a wet state through a tacky state and finally to a reversible, substantially tack-free state, tackiness or stickiness being measured by actually feeling the particles with the hand. The particles may be used, as will be described, when they are still in the wet or tacky state, although it may be more convenient to dry the particles to a tack-free state before they are bagged and prepared for shipment. "Reversible" tack-free state, as used herein, means that the surfaces of the tack-free particles may be made tacky again by addition of moisture (e.g., low pressure steam).

It is an important feature of the invention to coat the particles with the correct amount of water glass. If too much water glass is employed, the density of the resulting shaped article will be too high for convenient use, e.g., above about 3-4 lbs. per cubic foot. Moreover, the resulting high concentration of water glass solid tends to reduce the insulating qualities of the article. If, on the other hand, too little water glass is employed, I have found that the particles will not sufficiently adhere to one another to make an acceptable article. Indeed, it appears that the use of too small of an amount of water glass tends to reduce the particle-to-particle adhesion below that which would be obtained had no water glass at all been employed. Moreover, it will be understood that the fire resistant properties of the resulting article would be impaired.

The correct amount of water glass employed as a coating on the particles is such that when the particles are dried to a tack-free state, the concentration of water glass (plus any residual water) in the coated particles ranges from about 70% to about 20% of the total coated particle weight. In other words, the coated particles should comprise about 30%-80% by weight of styrene polymer solids. The weight of coating added to the particles can be easily determined by weighing a mass of the particles before and after the coating and drying procedure. The concentration of water glass in the particles can be increased by increasing the concentration of water glass in the aqueous solution, or by repeated immersion of the particles in the water glass solution. The concentration of water glass in the particles can be decreased, on the other hand, by diluting the water glass solution with water. Desirably, the concentration of styrene polymer in the coated beads, when dried to a tack-free state, ranges from about $\frac{1}{2}$ to about $\frac{2}{3}$ and excellent results have been obtained with a ratio of polymer solids to total weight of the coated particles of approximately 60%.

The coating or coating and drying procedure described above eliminates the static electricity problem inherent in uncoated beads and small bead-containing particles in which the beads, unless confined, repel one another with a force causing them to scatter. In contrast, the coated beads or bead-containing particles of the invention do not appear to retain a static charge, and hence can be stirred or otherwise moved without incident.

The coated particles of the invention may be easily shaped into desired configurations to make an insulating, fire-resistant product. In one embodiment, the coated particles, while still wet or slightly tacky, are introduced into a mold and are then dried, with or without the application of heat. As an example, slightly tacky particles (which still have the ability to flow past one another, as when a particle-containing bag is opened and dumped), may be deposited between the joists in the ceiling of a residence to insulate the ceiling. When the spaces between the adjacent joists have been filled, the shaped mass of particles may then be simply air dried for up to a week or more until a tack-free state is reached. Heat may be applied, if desired, to shorten the drying time, and the particles may be compressed slightly, if desired, to reduce interparticle voids.

In another embodiment, the coated particles may be dried to a tack-free state and may then be introduced into a form or mold, the particles flowing easily to fill the mold. The thus-shaped mass of particles may be optionally compressed slightly to additionally reduce voids, following which low pressure steam may be applied to the particles to add tackifying moisture and to raise the temperature of the particles so that they fuse together. The fused, formed particles may then be air dried, as aforesaid, to produce the shaped, insulating, fire-resistant product. As noted above, the foaming or blowing agent (e.g., n-pentane) is ordinarily driven from the styrene polymer expanded particles before the latter has been coated with waterglass in accordance with the invention. I have found, however, that even if all of the blowing agent such as n-pentane has not diffused out of the beads prior to the water glass coating, the latter coating remains permeable to the flowing agent and permits the latter to diffuse out of the particles or formed product with time.

Water glass is a substance well known to the art, and comprises water-soluble alkali metal silicate, usually sodium silicate, and additional silicon dioxide. Water glass is commonly assigned the chemical formula $Na_2O \cdot (x)SiO_2$ wherein x can vary widely but is ordinarily in the range of about 0.5–3.75 and more commonly in the range of about 2–3.5. The exact composition of the water glass is not of great importance in the system of the present invention, although the higher levels of $SiO_2$ are desired, e.g., where x is greater than about 2. I desire to use an aqueous water glass solution having a slightly syrupy consistency. On the one hand, the viscosity of the solution must be sufficiently low as to enable the styrene polymer particles to be quickly and thoroughly wetted; on the other hand, the solids content of the water glass solution must be sufficiently high as to provide the correct coating weight of water glass on the particles, preferably with but a single treatment of the particles with the water glass solution. Good results have been obtained with a water glass solution termed "STAR" sodium silicate by its commercial producer, the Philadelphia Quartz Company. This solution, at 42° Be' (68° F.), has a viscosity at 68° F. of 60 cps. The ratio of $SiO_2$ to $Na_2O$ ("x" in the above formula) is 2.5.

In a preferred method of the invention, non-expanded styrene polymer particles are immersed in a solution of water glass preheated to a temperature of 212° F.–240° F. In this method, heat from the water glass is itself transferred to the non-expanded particles to cause the particles to expand, with concurrent treatment or coating of the particles with the water glass. It will be understood that the mass of particles must be heated above the first order transition point (i.e., the "glass" transition point) in order for expansion to occur. If desired, the expansion and coating process may be controlled by selecting the quantity and temperature of the water glass solution so that the amount of heat energy transferred to the particles is just sufficient to raise the particles to a temperature above the "glass" point but below the melting point. In this manner, the correct quantity of water glass solution for a given quantity of styrene polymer particles may be determined from the weight ratio of water glass solids to polymer solids in the desired final product, and also from the heat capacity of the particles and of the water glass solution, heat losses to the environment, etc.

I have also discovered that it is possible to render the pourable, tack-free particles insoluble in water, the resulting insulating product thus being waterproof and hence appropriate for use in situations in which the product may come into contact with water. The styrene polymer solids concentration of the pourable, tack-free particulate mass, and the bulk density of the finished, dried insulating product, are substantially the same as those reported above. The water-insolubilization is accomplished at one or more points during the procedure for manufacturing the pourable, tack-free particles by acidifying the water glass moiety. The acidifying step reduces the pH of the water glass, and causes at least some precipitation to occur. Although I do not wish to be bound by the following explanation, it appears the acidifying step causes at least partial precipitation of silicic acid, the latter forming a water gel on the surfaces of the styrene polymer particles upon drying. The gel appears to be irreversible: that is, it does not redissolve in water. Further drying of the substantially tack-free pourable particulate mass causes the gel to harden and renders the product waterproof.

The preferred acidification method involves treatment of a water glass solution with an acidifying agent before the water glass is coated onto the polymer particles. This can be accomplished by sparging a water glass solution with an acidifying gas such as carbon dioxide until a slight opacity or haze is induced in the solution. The haze is believed to be a very fine dispersion of silicic acid. During the sparging procedure, the pH of the solution falls to a value of about 8. Polymer particles are then coated with the solution, as by immersion of the particles in the solution, and the particles are then dried as aforesaid to a substantially tack-free state in which the particles remain pourable but still retain the property of adhering to one another when shaped (as by pouring the particles into spaces between ceiling joists). Upon drying, the particles form a strong, cohesive, waterproof mass.

If desired, the acidification step may be performed when the water glass-coated particles have been dried to a reversible substantially tack-free state. This may be readily accomplished by merely flowing carbon dioxide gas through a mass of the particles in an appropriate container, such as a plastic bag in which the particles have been placed for sale. Perhaps the most simple manner of performing this process on a small-scale basis is to thrust a small, perforated tube within a bag of the particles, and then force carbon dioxide into the tube, the carbon dioxide thence escaping through the open mouth of the bag. If desired, carbon dioxide gas or other acidifying gaseous substance may be employed as the drying agent to remove water from the coated particles and to render the particles substantially tack-free.

For reasons of economy and ease of manufacture, the preferred acidifying agent is carbon dioxide gas. When the water glass solution itself is acidified by addition of an acidifying agent, as by sparging carbon dioxide therethrough, it is desirable to maintain the water glass as a homogeneous liquid, the sparging procedure tending to agitate the water glass solution so that the pH of the entire solution is slowly reduced.

When practicing embodiments of the invention, it is important that the styrene polymer particles be substantially completely coated with the water glass solution.

It has been found that the water glass solution readily wets the surface of such particles, each particle thus in effect being encapsulated within a silicacious shell. Complete wetting of the particles, of course, is facilitated by employing water glass solutions of reasonably low viscosity. It is believed that the substantially complete encapsulation of each styrene polymer particle provides the rather surprising fire resistance of the product. The substantially tack-free particulate mass of the invention thus provides a combination of desirable properties. The particles are "pourable"—that is, the particles can be readily poured from a container without undue "clumping" of particles, thereby permitting the particles to be easily formed to a desired shape and to flow into areas to be insulated. The particles do not exhibit a static charge normally associated with expanded polystyrene beads, and thus can be easily handled. The resulting product does not support combustion, and may be waterproof as discussed above. Moreover, the final product has a low bulk density desirably not exceeding about 2 lbs. per cubic foot and hence is highly desirable for use in areas such as ceilings and roofs in which a lightweight, highly insulating material is desired. Yet, notwithstanding the rather low bulk density of the material, the particulate mass can be further dried, as with air, to form a strong, unitary insulating mass.

The invention may be more easily understood by reference to the following, non-limiting examples:

EXAMPLE I

Polystyrene scrap consisting of expanded polystyrene beads and aggregations of beads was obtained and was aged to remove any residual blowing agents. The particles (0.9 pounds) were immersed in an aqueous solution of the above-described "STAR" water glass. The particles were stirred to insure complete wetting, and were then removed from the water glass solution. After draining for a few minutes, the particles were found to have picked up 1.7 lbs. of water glass solution. After drying in a stream of air until the particle coatings, by hand feel, were determined to be substantially tack-free, the mass of coated particles was found to weight 1.58 lbs. Simple calculation shows the weight percent of polystyrene in the coated particles to be approximately 57%.

The dried particles were then charged into a rectangular mold to simulate the manufacture of insulating sheets. Low pressure steam was then passed through the shaped mass of particles until the latter absorbed 2%–3% of moisture, following which the steam was discontinued and the particles were slightly compressed within the mold in order to reduce the volume of voids between particles. The mass of particles was then air dried for several days until the particles were tack-free to the touch.

The resulting board had a density of about 1.58 lbs. per cubic foot. The flame from a propane torch was played against the board in an attempt to ignite the latter. That area of the board exposed to the torch flames was reduced to a fine, greyish-white ash without liberation of smoke.

EXAMPLES II–VI

The procedure of Example I was duplicated except that the following water glass solutions were employed:

| Example | SiO/Na$_2$O | Viscosity, Cp. | % Na$_2$O | Trade Name[a] |
|---|---|---|---|---|
| II | 3.75 | 220 | 6.75 | S-35 |
| III | 3.22 | 60 | 8.20 | N-38 |
| IV | 3.22 | 100 | 8.60 | E |
| V | 3.22 | 400 | 9.16 | O |
| VI | 2.40 | 2100[b] | 13.85 | RU |

[a]Products of the Philadelphia Quartz Company.
[b]Solution was heated mildly to reduce viscosity during treatment of particles.

Final products having bulk densities falling in the range of 1.25–3 lbs. per cubic foot and having polystyrene concentrations in the range of 30%–80% were obtained. None of the products supported combustion when tested as in Example I.

EXAMPLE VII

The coating procedure of Example I was duplicated, but the coated particles, when still slightly tacky, were poured into a form having spaced, upright walls simulating the space between upright joists in the ceiling of a frame residence. The slightly tacky particles flowed easily, and any clumps of particles which had loosely adhered together were easily broken up by hand. After the particles had been distributed in the form, the mass of particles was compressed slightly through the use of a flat board or cover to reduce the volume of inter-particle voids. The cover was then removed and the compressed mass of particles was permitted to air dry for several days until the particles were substantially tack-free to the touch. The dried mass of particles, formed in situ to simulate ceiling insulation in a residence, would not support combustion when attempts were made to ignite the same with a propane torch.

EXAMPLE VIII

Polystyrene scrap, consisting of expanded polystyrene beads and aggregations of such beads, were augered by means of a ribbon blender through a solution of the "STAR" sodium silicate solution used without dilution and having a viscosity at about room temperature of approximately 60 cps. The thoroughly wetted particles from the blender were drained briefly and then weighed. The particles were found to have increased in weight by 1.8 lbs. per original pound of dry particles. The particles were then dried in air to a point where they were still slightly moist to the touch but had not yet become tacky. The particles were then poured into the spaces between joists of a building. Upon continued air drying, the particles passed through a state in which their surfaces were noticeably tacky to the touch, to a state in which the particles were substantially tack-free; e.g., in which the particle surfaces were dry to the touch. The resultant dried, cellular, insulating product was found to have a weight of 1.7 lbs. per original pound of particles, and exhibited a bulk density of 1.7 lbs. per cubic foot.

The coated particles, in accordance with the invention, when dried to a tack-free state, can be formed into a resultant shaped product such as an insulation board by an extrusion process. In this process, dried, tack-free particles may be fed into an extruder, and low pressure steam may be added through ports in the extruder in an amount sufficient to render the surfaces of the particles at least tacky. The pressure which is developed in the extruder tends to compress the particles and to greatly reduce the volume of interparticle voids. The particles may be extruded through a wide-mouthed die (e.g., having an orifice 2 inches in width and 4 feet in length) to produce a continuous length of insulating sheet stock. The pressures which are developed in the extruder are maintained sufficiently low so as to avoid great deformation or rupturing of the individual polymer beads, and this is facilitated by the use of a wide orifice die. The temperature of the particles in the extruder is maintained below the melting point of the polystyrene, and the water glass coating serves to adhere the particles one to another to form glue lines between particles to produce a comparatively strong product.

EXAMPLE IX

One pound of pre-expanded polystyrene beads and 1 lb. of "STAR" water glass solution (described above) were combined and thoroughly mixed in a suitable container until the beads had been substantially thoroughly coated with the waterglass solution. The water glass solution was substantially completely taken up by the beads. The resulting product was dried to a tack-free state, and was found to have a weight of 1.4 lbs. which corresponds to a polymer concentration of about 71.5%. A board-like product made from the coated beads was found to be non-supportive of combustion when struck by the flame from a propane torch.

EXAMPLE X

To a water glass solution (the "STAR" water glass solution referred to above) was added 1 oz. per gallon of "Cab-o-sil", a fumed silica product of the Cabot Corporation. A quantity of polystyrene beads were treated with the thickened solution in accordance with Example I. Upon drying to a tack-free state, the beads were found to have picked up approximately 2⅓lbs. of water glass solids per pound of beads, and the polymer content of the product was computed to be approximately 30%.

EXAMPLE XI

Unexpanded (e.g., "raw") polystyrene beads having a diameter of about 1/16 inch and including pentane-containing blowing agent were immersed in the "STAR" water glass solution described above, the solution having been preheated to a temperature of approximately 230° F. Within approximately 60 seconds, the beads had appropriately expanded and had become coated with the water glass solution. The product was comparable to that of Example I. By employing unexpanded beads, it was found that the beads could be much more quickly and thoroughly wetted with the water glass solution than could be pre-expanded beads.

EXAMPLE XII

By means of a sparging tube immersed in a container of the above-described "STAR" water glass, carbon dioxide was bubbled through the water glass until a faint haze was observed in the solution. A pH measurement showed that the pH had been reduced to a value of about 8.0. Polystyrene scrap consisting of expanded polystyrene beads and aggregations of beads were then charged to the water glass solution and were stirred to insure complete wetting of each particle. The particles were then removed, drained, and were dried until the particle coatings were found to be insoluble in water, and little clumping of particles was noted. The particle mass could easily be poured as a stream from a container.

The particles were then formed into a board, and were further dried by exposure to ambient air for several days. The resulting board was strong, indicating that the coated particles had adhered strongly together. Immersion of a small portion of the board in water indicated that the board was waterproof, the particles remaining adhered tightly together. The bulk density of the board was less than 2 lbs. per cubic foot. Attempts were made to ignite the board with a frame from a propane torch. The area of the board exposed to the torch flames was reduced to a fine, greyish-white ash without liberation of smoke. The board did not support combustion.

EXAMPLE XIII

A mass of coated, substantially tack-free particles were produced by the method of Example I. The particles were placed in large polyethylene bags, and the particles were treated with carbon dioxide gas by means of sparging tubes inserted in the bags. Sparging was continued until the particles exhibited a tendency to adhere to one another slightly, thus indicating that the particle coatings were drying. The particles were then poured from the bags and were formed into generally rectangular shapes approximating the spaces between ceiling joints, and air drying was permitted to occur for a period of several days. The resulting object was found to be strong and waterproof, and exhibited a bulk density of less than two pounds per cubic foot. The product did not support combustion.

EXAMPLE XIV

The process of Example XII was repeated, the resulting insulating boards having a thickness of not greater than about one inch. Prolonged exposure of a portion of the board to water did not provide any evidence of deterioration in strength or fire resistance. Attempts were made to force a gas under pressure through the board without success, thereby indicating that the board was substantially devoid of channels through its thickness.

The mechanism by which the formation of smoke is inhibited when the cellular product of the present invention is flamed with a torch or the like is not fully understood. Although I do not wish to limit myself to any particular theory, I believe that the water glass coating which is employed inhibits propagation of flame and somehow permits the oxidation of the polystyrene to approach completion wherein the oxidation products would be largely $CO_2$ and water. It is also thought probable that the encapsulating presence of the water glass greatly inhibits vaporization of the styrene polymer, and hence greatly reduces the ability of the latter to undergo combustion.

Thus, manifestly, I have provided insulating articles from cellular particles containing pre-expanded styrene polymer beads, which articles are on the one hand highly resistant to fire and on the other hand are low bulk density and easily adapted for commercial use. My invention provides a means for the gainful use of styrene polymer scraps resulting from the manufacture of insulating boards and the like.

While I have described a preferred embodiment of the present invention, it should be understood that various changes, adaptations, and modifications may be made therein without departing from the spirit of the invention and the scope of the appended claims.

What is claimed is:

1. A non-combustion-supporting insulating material which, upon application thereto of a flame, disintegrates to a fine ash, the material comprising a mass of styrene polymer beads, the particles having individual coatings of expanded dried water glass adhering the particles into a mass having a bulk density of from about 1.5 lbs. to about 2 lbs. per cubic foot, the mass containing from about 30 to about 80 percent of styrene polymer solids and about 20 to about 70 percent of dried water glass, by weight.

2. The material of claim 1 in which the ratio of styrene polymer solids to the weight of the mass ranges from about ½ to about ⅔.

3. A method for preparing expanded styrene polymer particles composed of one or more expanded styrene polymer beads for use in producing non-combustion-supporting shaped articles, the method comprising coating styrene polymer particles with sufficient water glass from an aqueous solution so that the particles, when dried to a reversible, pourable, tack-free state, comprise from about 30% to about 80% styrene polymer solids, from about 20% to about 70% dried water glass, exhibit a bulk density of about 1.5–2 pounds per cubic foot and, upon application thereto of a flame, disintegrate to a fine ash.

4. The method of claim 3 wherein the particles are coated by immersing them in the aqueous water glass solution.

5. The method of claim 3 including drying the particles to a substantially free-flowing, tack-free state.

6. Method for preparing a non-combustion-supporting cellular, shaped styrene polymer article which comprises coating styrene polymer particles composed of one or more expanded styrene polymer beads with sufficient water glass from an aqueous solution so that the particles, if dried to a tack-free state, comprise about 30% to about 80% styrene polymer solids and about 20% to about 70% dried water glass by weight, forming the particles into the desired article, and with the particles having a slightly tacky surface, drying the particles, whereupon the particles adhere together through their coatings to form the shaped article, the article having a bulk density of about 1.5–2 pounds per cubic foot and, upon application thereto of a flame, disintegrating to a fine ash.

7. The method of claim 6 wherein the coated particles, while having tacky surfaces, are shaped into the desired article.

8. The method of claim 6 in which the coated particles, before shaping, are dried to a tack-free state, wherein the dried particles are formed into the desired article shape, and wherein moisture is added to the shaped mass of articles to render the particle surfaces tacky and adherent to one another.

9. A shapable material for forming shaped, cellular non-combustion-supporting articles and comprising a mass of flowable, pourable styrene polymer particles composed of one or more expanded styrene polymer beads, the particles having individual coatings of dried water glass, and the mass containing from about 30 to about 80 percent styrene polymer solids and from about 20 to about 70 percent dried water glass when the water glass has been dried to a reversible, tack-free state, the mass disintegrating to a fine ash upon application thereto of a flame.

10. A non-combustion-supporting insulating material comprising a mass of pourable, flowable styrene polymer particles composed of one or more expanded styrene polymer beads, the particles having individual coatings of water glass dried to a substantially tack-free state, the mass containing from about 30 to about 80 weight percent of styrene polymer solids and from about 20 percent to about 70 percent of dried water glass, the mass being convertible, upon further drying, to form an insulating object non-supportive of combustion, having a bulk density of from about 1.25 to about 3 lbs. per cubic foot, and upon application thereto of a flame, disintegrating to a fine ash.

11. The insulating material of claim 10 in which the individual particle coatings are insoluble in water.

12. An insulating material comprising a mass of styrene polymer particles composed of one or more expanded styrene polymer beads, each particle having a substantially continuous, water-soluble coating of water glass and the containers being substantially tack-free to the touch, the particulate mass being easily pourable from a container and comprising about 30 to about 80 weight percent of styrene polymer solids, the pourable mass being formable into a multi-particle object which is non-supportive of combustion, is waterproof, and exhibits a bulk density of not greater than about 2 lbs. per cubic foot.

13. A method for preparing expanded styrene polymer particles composed of one or more styrene polymer beads for use in producing non-combustion-supporting shaped articles, the method comprising substantially completely coating styrene polymer particles with sufficient water glass from an aqueous solution so that the particles, when dried to a pourable, flowable, substantially tack-free state, comprise from about 30% to about 80% styrene polymer solids and about 20% to about 70% dried water glass, and disintegrating to a fine ash upon application thereto of a flame, the method including the step of acidifying the water glass to render the polymer particle coating insoluble in water.

14. The method of claim 12 in which the water glass is acidified prior to coating the same upon the particles.

15. The method of claim 13 in which the water glass is acidified after coating the same upon the particles.

16. The method of claim 14 in which the water glass is acidified by treating the same with carbon dioxide gas.

17. A method for preparing expanded styrene polymer particles composed of one or more expanded styrene polymer beads for use in producing non-combustion-supporting shaped articles, the method comprising acidifying an aqueous water glass solution by treatment thereof with carbon dioxide gas until the solution becomes slightly hazy, and then substantially completely coating the styrene polymer particles with the acidified water glass so that the particles, when dried to a water-insoluble, substantially tack-free pourable state, comprise from about 30 percent to about 80 percent styrene polymer solids.

18. A non-combustion-supporting insulating material comprising a mass of styrene polymer particles composed of one or more expanded styrene polymer beads, the particles having individual, water-insoluble coatings of dried water glass adhering the particles into a strong, waterproof, combustion resistant mass having a bulk density not exceeding about 2 lbs. per cubic foot, containing from about 30 to about 80 weight percent of styrene polymer solids and from 20 to about 70 weight percent of dried water glass and disintegrating to a fine ash upon application thereto of a flame.

* * * * *